Dec. 7, 1926.
L. M. WOOLSON
1,609,531
ELECTRIC MOTOR OR GENERATOR
Filed April 18, 1922
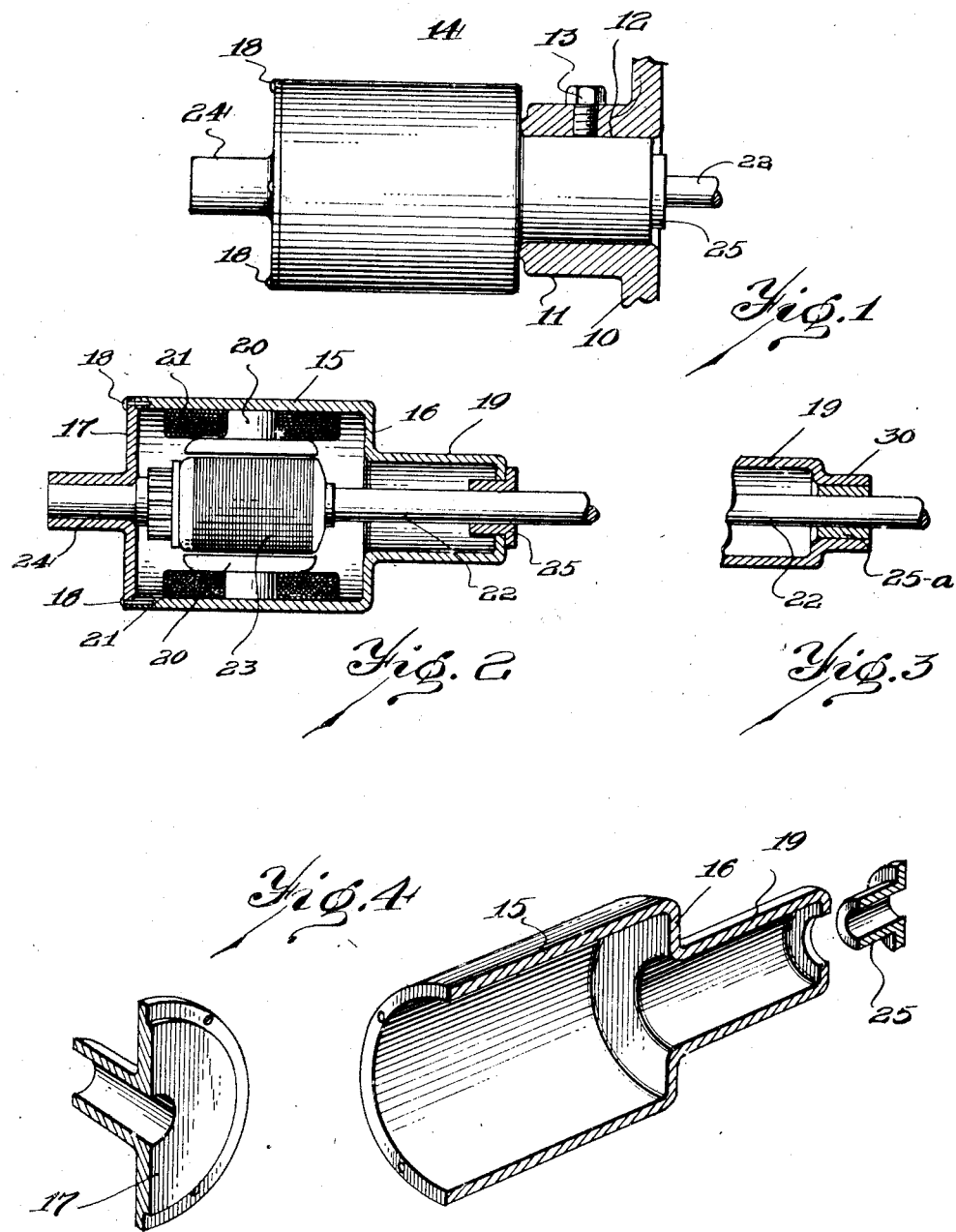
Inventor
Lionel M. Woolson.
By Milton Tibbetts
Attorney Patented Dec. 7, 1926.

1,609,531

UNITED STATES PATENT OFFICE.

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN.

ELECTRIC MOTOR OR GENERATOR.

Application filed April 18, 1922. Serial No. 555,180.

This invention relates to dynamo electric machines such as motors or generators and particularly to the construction of the casing or shell part of the motor or generator.

The salient object of the invention is to produce a shell for a motor or generator at a smaller cost than has heretofore been accomplished.

Another object of the invention is to produce a shell for a motor or generator, not only at a lower cost, but with increased accuracy and strength.

Heretofore in electric motors or generators as used particularly for the electrical equipment of automobile engines, the shell and the two ends thereof have been made in separate parts. This has necessitated the close finishing of both ends of the shell, the attachment of those ends to the shell, and the close finishing of one of the ends for supporting the motor or generator. All of these machined parts must be very closely concentric with the bearings for the armature shaft and these close machining operations all tend to make for increased cost of production.

In the present invention the shell and one of its ends are made integral and the integral end is formed with a supporting part which is machined to fit into a machined opening in the support for the motor or generator. The only machining necessary, therefore, on the shell is the one end of the shell, the part of the integral end which cooperates with the support, and the part thereof which contains the bearing for the armature shaft. The detachable end piece for the opposite end of the shell is, of course, machined and fitted to the shell and secured thereon.

The above and other objects and advantages of the invention will appear from the following description taken in connection with the drawings, which form a part of this specification, and in which:

Fig. 1 is an elevation view of a motor or generator made in accordance with this invention, the unit being shown mounted in a support;

Fig. 2 is a longitudinal section through the motor or generator shown in Fig. 1;

Fig. 3 shows a slightly modified form of one end of the device; and

Fig. 4 is a perspective view of several of the parts of the motor or generator, these parts being shown in section and disconnected for better illustration.

Referring to the drawings 10 indicates a support for a motor or generator. This support may be a part of the crank case of an internal combustion engine and it may be adapted to hold the electrical machine for constant geared connection with the crank shaft if the machine is a generator or for adjustable geared connection with the engine fly-wheel if the machine is an electric starting motor. The connections are not shown.

The support 10 is shown as formed with a boss 11 in which there is a machined opening 12 to receive a part of the motor or generator. A bolt 13 is threaded into the boss and is adapted to retain the motor or generator in place.

A motor or generator built in accordance with this invention is shown at 14 and it consists of two principal casing parts. One of these parts is a shell 15 which has one of its ends 16 formed integral with it. The other end of the shell is detachable and forms the other principal element of the casing. It is indicated at 17 and it is detachably secured to the shell 15 as by screws 18 or similar devices.

The integral end 16 has a supporting piece or extension 19 formed thereon thus making the single piece formed by the parts 15, 16 and 19 of somewhat bottle shape. This shaped piece may be drawn from a single piece of steel and thus the shell of the motor or generator, one of its ends, and the supporting extension or neck 19 may be formed of a single sheet metal piece and the cost thereof, in large quantities, will be very much less than would be the cost of making these parts in several pieces and machining them and joining them together.

The extension 19 is machined on the outside to fit the opening 12 in the support 10 and when the extension is in place the bolt 13 may be tightened down against it to retain the extension therein.

Within the shell 15 are mounted the pole pieces 20 and the field coils 21. The armature shaft 22 of the motor or generator, with its armature 23, is supported in a bearing 24 formed in the end piece 17 and a bearing 25 in the extension 19 and the armature shaft extends through the bearing 25 for connection with some part of the internal combustion engine, either for driving the latter or being driven by it, depending upon whether the electrical machine is a motor or a generator.

From the above it will be seen that the machining of the integral parts of the shell 15 is very simple. Its open end is machined to receive the end piece 17; its extension 19 is machined externally to fit the opening 12; and some part of the interior of the extension 19 is machined, concentric with its exterior to receive the bearing 25. It is then easy to machine the end piece 17 and make its bearing 24 concentric with that part which fits within the shell 15 and by so doing the bearing 24 and the bearing 25 are brought into perfect alignment.

In Fig. 3 a slightly modified arrangement of bearing in the extension 19 is shown. The extension is formed with an outwardly extending boss 30 which is machined interiorly, and a bearing 25$^a$ is inserted therein to receive the armature shaft 22.

The shell 15 and its extension 19 are shown as cylindrical and in most cases they would be substantially cylindrical. The exterior of the extension 19 is also shown as concentric with the shaft 22. These are the forms shown in this particular illustrative form of the invention but modifications of these parts within the terms of the claims may be made without departing from the spirit or scope of the invention.

Having thus described my invention, what I claim and desire to secure by Letters Patent is:

A dynamo electric machine comprising a substantially cylindrical shell part, an integral end part having a contracted portion forming a cylindrical supporting neck, and a detachable end part for the other end of the shell.

In testimony whereof I affix my signature.

LIONEL M. WOOLSON.